United States Patent [19]  
Nishio et al.

[11] Patent Number: 4,801,645  
[45] Date of Patent: Jan. 31, 1989

[54] THERMOPLASTIC RESIN COMPOSITION

[75] Inventors: Taichi Nishio; Takashi Sanada; Takayuki Okada, all of Chiba, Japan

[73] Assignee: Sumitomo Chemical Company, Ltd., Osaka, Japan

[21] Appl. No.: 27,532

[22] Filed: Mar. 18, 1987

[30] Foreign Application Priority Data

Mar. 24, 1986 [JP] Japan ................................ 61-66541

[51] Int. Cl.⁴ .............................................. C08L 71/04
[52] U.S. Cl. ........................................ 525/68; 525/65
[58] Field of Search .................. 525/65, 66, 68, 92, 525/132

[56] References Cited

U.S. PATENT DOCUMENTS

| | | | |
|---|---|---|---|
| 4,245,061 | 1/1981 | Tachi et al. | 525/66 |
| 4,315,086 | 2/1982 | Ueno et al. | 525/391 |
| 4,338,413 | 7/1982 | Coran et al. | 525/66 |
| 4,454,284 | 6/1984 | Ueno et al. | 525/68 |
| 4,456,732 | 7/1984 | Nambu et al. | 525/65 |
| 4,550,130 | 10/1985 | Kishida et al. | 525/66 |

FOREIGN PATENT DOCUMENTS

| | | | |
|---|---|---|---|
| 0055473 | 7/1982 | European Pat. Off. | |
| 45-30943 | 10/1970 | Japan | 525/66 |
| 45-30944 | 10/1970 | Japan | 525/132 |
| 53-141360 | 12/1978 | Japan | 525/66 |
| 56-22344 | 5/1981 | Japan | |
| 1403797 | 8/1975 | United Kingdom | 525/66 |

OTHER PUBLICATIONS

Patent Abstract of Japan, vol. 10, No. 136 (C-347) [2193], May 20, 1986.

Primary Examiner—John C. Bleutge  
Assistant Examiner—Robert E. L. Sellers, II  
Attorney, Agent, or Firm—Cushman, Darby & Cushman

[57] ABSTRACT

Thermoplastic resin composition is provided which comprises epoxy compound in a resin made from polyphenylene ether and modified-polyolefin with or without polypropylene. The composition is useful for preparing shaped articles, sheet or film and is superior in heat resistance, mechanical properties and processability.

6 Claims, No Drawings

THERMOPLASTIC RESIN COMPOSITION

This invention relates to a novel thermoplastic resin composition suitable for shaped articles, sheet or film by injection molding or extrusion molding. More particularly, it relates to a novel thermoplastic resin composition superior in heat resistance, mechanical properties and processability, which contains epoxy compounds in a resin composition of polyphenylene ether and modified-polyolefin.

Polyphenylene ether is thermoplastic resin superior in various mechanical properties, heat resistance, electrical properties, chemical resistance, hot water resistance, flame resistance and dimention stability, but inferior in processability due to high melt viscosity and relatively inferior in impact resistance.

A composite material comprising polyphenylene ether and polystyrene is proposed in order to lessen melt viscosity of polyphenylene ether and to improve processability thereof, leaving various other good properties of polyphenylene ether unchanged. However, such inherent good properties of polyphenylene as heat resistance, flame resistance and chemical resistance are somewhat damaged when enough polystyrene is added to provide processability practically workable. No sufficient improvement is seen in impact resistance, either, even after polystyrene is added.

Polyolefin is a familiar material for preparing various shaped articles, film and sheet, since it is inexpensive and superior in processability, toughness, water resistance and chemical resistance, and has low specific gravity. However, application is narrowed because heat resistance, rigidity, impact resistance, coating ability and adherence are not satisfactory. Improvement in heat resistance and impact resistance, in particular, has been strongly desired.

Development is expected in new application if a resin composition is prepared in which polyphenylene ether and polyolefin are blended, maintaining favorite properties of both components and having improved processability and impact resistance. However, polyphenylene ether, one of polar polymers, is poor compatible with polyolefin, one of non-polar polymers, and their melt viscosities are greatly far from each other. Simple blending encounters the following difficulties, for example;

1. hardness in stable take-up of strands extruded and greatly lower processability in molding, because their melt viscosity difference is very large; and 2. no improvement in mechanical properties of the shaped articles, particularly in impact resistance, but rather lower than expected on the basis of their respective values.

One approach to dissolve the problems is blending polyphenylene ether and styrene-grafted polyolefin (Japanese patent publication (Kokai) No. 49-75663). However, this approach does not aim to improve heat resistance nor mechanical properties but to improve processability of polyphenylene ether without degradation in mechanical strength thereof.

After a study on polyphenylene ether/polyolefin blend, we have found that addition of a modified-polyolefin as well as epoxy compound to polyphenylene ether improves impact resistance to provide good balance between heat resistance and impact resistance, not impairing good processability of the blend.

According to the present invention, a thermoplastic resin composition is provided by blending (A) and (B) defined below:

(A): 100 parts by weight of a resin composition comprising (a) and (b) defined below:

(a) being 5–95 % by weight of polyphenylene ether obtained, for example, by oxidation polymerization of at least one phenol represented by the formula:

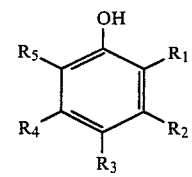

wherein $R_1$, $R_2$, $R_3$, $R_4$ and $R_5$ each represents a hydrogen atom, a halogen atom or a substituted or unsubstituted hydrocarbon residue and at least one of them is a hydrogen atom, and (b) being 95–5 % by weight of modified-polyolefin, and (B) 0 01–50 parts by weight of epoxy compound.

Polyphenylene ether resin (a) is polymer obtained, for example, by oxidation polymerization of one or more of phenol compounds having the formula:

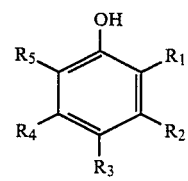

wherein $R_1$, $R_2$, $R_3$, $R_4$ and $R_5$ each represents a hydrogen atom, a halogen atom or a hydrocarbon residue substituted or not and at least one of them is a hydrogen atom, with molecular oxygen or gas containing the same in the presence of an oxidation coupling catalyst.

Examples of $R_1$–$R_5$ are a hydrogen atom, a chlorine atom, a bromine atom, a fluorine atom, an iodine atom, a methyl group, an ethyl group, an n- or iso-propyl group, a pri.-, sec.- or tert.-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group or an allyl group.

Examples of phenol compound are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t. butylphenol, thymol and 2-methyl-6-allylphenol. Alternatively, copolymer of any of the phenol compound listed above and the other phenol compound, for example, polyhydroxy aromatic compound, may be employed. The polyhydroxy aromatic compound is, for example, bisphenol A, tetrabromobisphenol A, resorcin, hydroquinone and novolack resin.

Preferably polymers are homopolymer of 2,6-dimethylphenol or 2,6-diphenylphenol and copolymers of a large amount of 2,6-xylenol and a small amount of 3-methyl-6-t-butylphenol or of 2,3,6-trimethylphenol.

Any oxydation coupling catalyst may be employed for oxydation polymerization of phenol compound, as long as it has polymerization ability. Examples are cuprous compound/tert. amine such as cuprous chloride/triethylamine and cuprous chloride/pyridine; cupric compound/amide/alkali metal hydroxide such as cupric chloride/pyridine/potassium hydroxide; manganese salt/primary amine such as manganese chloride/ethanolamine and manganese acetate/ethylenediamine; manganese salt/alcolate or phenolate such as manganese chloride/sodium methylate and manganese chloride/sodium phenolate; and cobalt salt/tert. amine.

Polymerization temperature for preparing polyphenylene ether is 40° C. or higher (high temperature polymerization) or lower (low temperature polymerization). Either temperature may be used, although polymers produced thereby have different properties.

Polyphenylene ether further includes that grafted with styrenic polymer or other polymer. For instance, grafted one is obtained by graft-polymerizing styrene monomer and/or other comonomer in the presence of polyphenylene ether and organic peroxide (Japanese patent publications (Kokoku) Nos. 47-47862, 48-12197, 49-5623, 52-38596 and 52-30991) or by melt-kneading polyphenylene ether and polystyrene in the presence of a radical initiator.

Modified-polyolefin is polyolefin such as polyethylene, polypropylene and ethylene-propylene rubber, which is grafted by 0.05–20 % by weight, preferably 0.1–10 % by weight based on the polyolefin, of one or more comonomers which are capable to react or compatible with the polyolefin as well as the epoxy compound. In the present invention, the modified-polyolefin may be used alone or in the form of a mixture of 1–99 % by weight, preferably 1–90 %, more preferably 1–70 % by weight, of polypropylene therewith.

The comonomer to be grafted is a compound having a carboxyl group, an acid anhydride group, an acid amide group, an amino group or a hydroxyl group, or oxazolines.

Examples of the comonomer are maleic anhydride, maleic acid, fumaric acid, maleimide, maleic acid hydrazide, a reaction product of maleic anhydride and diamine, e.g., compounds having the formulas

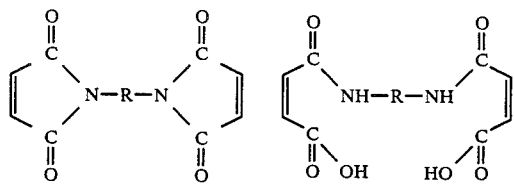

wherein R is an aliphatic or aromatic group, methylnadic anhydride, dichloromaleic anhydride, maleic acid amide and, natural fats and oils such as soybean oil, tung oil, castor oil, linseed oil, hempseed oil, cottonseed oil, sesame oil, rapeseed oil, peanut oil, camellia oil, olive oil, coconut oil and sardine oil; unsaturated carboxylic acid such as acrylic acid, butenoic acid, crotonic acid, vinyl acetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleostearic acid, oleic acid, eicosapentaenic acid, erucic acid, docosadienic acid, docosatrienic acid, docosatetraenic acid, docosapentaenic acid, tetracosenoic acid, hexacosenoic acid, hexacodienoic acid, octacosenoic acid, and tetraaconitic acid; ester, acid amide or anhydride of unsaturated carboxylic acid above; unsaturated oxazoline; unsaturated alcohol such as allyl alcohol, crotyl alcohol, methylvinyl carbinol, allyl carbinol, methylpropenyl carbinol, 4-penten-1-ol, 10-undecene-1-ol, propargyl alcohol, 1,4-pentadiene-3-ol, 1,4-hexadiene-3-ol, 3,5-hexadiene2-ol, 2,4-hexadiene-1-ol, alcohol of the formula: $C_nH_{2n-5}OH$, $C_nH_{2n-7}OH$ or $C_nH_{2n-9}OH$ (n is an integer), 3-buten-1,2-diol, 2,5-dimethyl-3-hexene-2,5-diol, 1,5-hexadiene-3,4-diol or 2,6-octadiene-4,5-diol; and unsaturated amine such as that where an OH group of the unsaturated alcohol is replaced by an —NH$_2$ group.

Preferable comonomer is acrylic acid or maleic anhydride.

Grafting the monomer onto polyolefin may be effected by various known methods. For example, polyolefin, monomer to be grafted, and a radical initiator are mixed and kneaded in a molten state in an extruder; polyolefin is dissolved in an organic solvent such as xylene and the mixture is allowed to react with monomer to be grafted under heating with stirring in the presence of a radical initiator in a nitrogen atmosphere until the mixture is cooled slowly, washed and filtered before drying; or polyolefin is irradiated with ultraviolet ray or radial ray or is brought into contact with oxygen or ozone in the presence of monomer to be grafted.

Polypropylene to be mixed with modified-polyolefin is crystalline one. It includes homopolypropylene and block or random copolymer of propylene/α-olefin such as ethylene or buten-1. Preferable polypropylene is one having melt index of 0.1–100 g/10 min., more preferably 0.5–40 g/10 min. The homo, block or random copolymer is obtained by polymerization in the presence of so-called "Ziegler-Natta catalyst", e.g., titanium trichloride/alkyl aluminium compound.

Blending ratio in (A) between (a) polyphenylene other and (b) modified-polyolefin is 5–95 % by weight of the former and 95–5 % by weight of the latter. When an amount of polyphenylene ether is more than 95% by weight, improvement in processability and impact strength is small, while when it is less than 5% by weight, thermal property, e.g., heat deformation temperature is degraded. Preferable ratio of polyphenylene ether is 10–80% by weight, more preferably 20–70% by weight.

Epoxy compound (B) includes epoxy resin and epoxy group-containing copolymer. Examples are bisphend A epoxy resin, O-cresol novolac epoxy resin, glycidylamine epoxy resin, three-functional epoxy resin and four-functional epoxy resin. The epoxy compound may further contain a reactive diluent.

Epoxy group-containing copolymer includes, for example, unsaturated epoxy compound/ethylenically unsaturated compound copolymer, epoxidized polyester and epoxidized polyamide. Unsaturated epoxy compound used for the unsaturated epoxy compound/ethylenically unsaturated compound copolymer has in a molecule both an epoxy group and an unsaturated group which is copolymerizable with the ethylenically unsaturated compound, for instance, unsaturated glycidyl ester and unsaturated glycidyl ether having the formula (1) and (2) below:

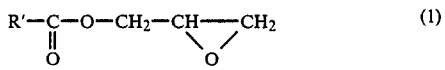 (1)

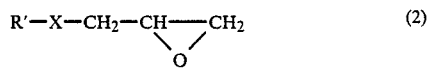 (2)

wherein $R'$ is a $C_2$–$C_{18}$ hydrocarbon group containing ethylenically unsaturated bond and X is —$CH_2$—O— or

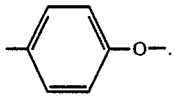

Examples are glycidyl acrylate, glycidyl methacrylate, glycidyl itaconate, allylglycidyl ether, 2-methylallyl glycidyl ether, styrene-p-glycidyl ether. The ethylenically unsaturated compound is olefin, vinyl ester of $C_2$–$C_6$ saturated carboxylic acid, $C_1$–$C_8$ saturated alcohol/acrylic or methacrylic acid ester, maleate, methacrylate, fumarate, halogenated vinyl, styrene, nitrile, vinyl ether or acrylamide. Examples are ethylene, propylene, butene-1, vinyl acetate, methyl acrylate, ethyl acrylate, methyl methacrylate, diethyl malate, diethyl fumarate, vinyl chloride, vinylidene chloride, styrene, acrylonitrile, isobutyl vinyl ether and acrylamide. They are used singly or in a mixture of at least two of them. Ethylene is preferable most of all.

Composition ratio in the epoxy group-containing copolymer is not critical, but 0.1–50% by weight, more preferably 1–30% by weight of unsaturated epoxy compound is preferred.

The epoxy group-containing copolymer is prepared by various methods. Either random copolymerization or graft copolymerization may be effected; in the former, unsaturated epoxy compound is introduced in backbone chain of copolymer, and in the latter, unsaturated epoxy compound is introduced in side chain of copolymer. Examples are copolymerization in which unsaturated epoxy compound is allowed to react with ethylene in the presence of a radical initiator under 500–4000 atm. at 100°–300° C. in the presence or absence of a solvent and a chain transfer agent; graft copolymerization in which polypropylene, unsaturated epoxy compound and a radical initiator are blended and allowed to melt in an extruder; and copolymerization in which unsaturated epoxy compound is allowed to react with ethylenically unsaturated compound in an inert solvent such as water or an organic solvent in the presence of a radical initiator.

Copolymer of unsaturated epoxy compound/ethylenically unsaturated compound is preferable, particularly, copolymer of unsaturated epoxy compound/ethylene/other ethylenically unsaturated compound than ethylene.

The epoxy compound (B) is blended in such an amount as 0.01–50 parts by weight, preferably 0.01–30 parts by weight every 100 parts by weight of a composition (A) containing polyphenylene ether (a) and modified-polyolefin (b). When an amount of the epoxy compound is less than 0.01 parts by weight, an improvement is poor, while when an amount thereof is more than 50 parts by weight, more gelation proceeds and processability is degraded.

The present composition may be used in such a form as a composite material reinforced with such fibers as glass fibers, carbon fibers, polyamide fibers or metal whiskers; or a composite material wherein inorganic fillers or flame retardants such as silica, alumina, calcium carbonate, talk, mica, carbonblack, $TiO_2$, ZnO or $Sb_2O_3$; lubricants; nuclear agents; plasticizers; dyes; pigments; antistatic agents; antioxidants; and/or weatherability providing agents are added.

Any process is used to prepare the present resin composition.

Melt-blending methods for the components are the best from an economical point of view, although it is possible to blend the components in a solution and evaporate the solvent or precipitate in a nonsolvent. Melt-blending is carried out in a single-screw or a twin-screw extruder, a kneader or so, preferably a high-speed twin-screw extruder.

Before kneading, it is preferable to uniformly blend powder or pellets of the component resins in a tumbler or a Henschel mixer. The first blending above is not always necessary. Alternatively, each resin may be fed to a kneader through a metering apparatus. Resin composition, after kneaded, is molded according to injection, extrusion and the like. Alternatively, dry blending the resin materials at the injection or extrusion molding without prekneading and direct kneading are made in the melt processing to produce a shaped article. Any order is used in the kneading step. For example, resins (a), (b), and (B) are kneaded together, or resins (a) and (b) are first kneaded before resin (B) is kneaded. However, it is not desirable to knead resins (b) and (B) and then add resin (a), because gellation occurs and desirable resin composition is not produced.

The present invention is explained referring to examples below, wherein the are merely illustrative ones, and this invention is not limited to them. Bending test, Izod impact strength and heat distortion temperature (which is abbreviated as H.D.T.) are observed in accordance with ASTMD790, JIK K7110 and ASTMD648, respectively.

Polyphenylene ether, a modified-polyolefin and epoxy-group containing copolymer used in the examples and comparison examples are obtained below except that polypropylene, ethylene/vinyl acetate copolymer and epoxy resin which are commercially available are employed.

Polyphenylene ether:

Manganese chloride/ethylenediamine is added to a solution of 2,6-dimethylphenol in toluene and methanol and then the solution is subjected to oxydation polymerization under a molecular oxygen atmosphere at 30° C. Intrinsic viscosity in chloroform is 0.55 dl/g.

Modified polypropylene:

The modified polypropylene is prepared in accordance with Japanese patent publication (Kokoku) No. 56-9925. In other words, a mixture of polypropylene (homopolymer manufactured by Sumitomo Chemical Company, Limited.; "Sumitomo Noblen" ® FS1012, M.I.=1.0 g/10 min.), maleic anhydride and tert-butyl peroxylaurate are extruded from an extruder (screw diameter: 30 mm; L/D =28; barrer temperature: 230° C.;screw rotation: 60 rpm). Molten strands extruded are cooled in water and pelletized. Amount of maleic anhydride grafted=0.11% by weight.

Epoxy compound:

Glycidyl methacrylate/ethylene/vinyl acetate copolymer is prepared in accordance with Japanese patent publications (Kokai) Nos. 47-23490 and 48-113883. That is, glycidyl methacrylate, ethylene, vinyl acetate, a radical initiator and a chain-transfer agent are successively fed in a reactor (40 l) made of stainless steel whose temperature is controlable and which is equipped with an inlet, an outlet and a stirrer, and copolymerization is effected under stirring under 1400–1600 atm. at 180°–200 ° C.

Polypropylene:

"Sumitomo Noblen" ® D 501, manufactured by Sumitomo Chemical Company, Limited; M.I.=0.3 g/10 min.

Ethylene/vinyl acetate copolymer:

"Sumitate" ® KA-31, manufactured by the same company as above.

Epoxy resin:

"Sumiepoxy" ® ELM-434 manufactured by Sumitomo Chemical Company, Limited; 4-functional epoxy resin, epoxy equivalent=110–130 g/eq.

EXAMPLE 1

A resin composition (100 parts by weight) made from polyphenylene ether (44.4% by weight), polypropylene (33.3% by weight) and modified polypropylene (22.3% by weight) and glycidyl methacrylate/ethylene/vinyl acetate copolymer (11.1 parts by weight) were melted and kneaded at 270° C. in a small batchwise twinscrew kneader ("Laboplastmil" ® manufactured by Toyo Seiki).

A composition obtained was pressed at 270° C. to prepare test pieces for Izod impact strength test, bending test and heat distortion temperature test.

Results are given in table 1 together with those of comparison examples 1 and 2.

COMPARISON EXAMPLE 1

Polyphenylene ether (40% by weight) and polypropylene (60% by weight) were melted and kneaded in the similar manner to that of example 1.

A composition obtained was pressed at 270° C. to prepare test pieces.

COMPARISON EXAMPLE 2

A resin composition made from polyphenylene ether (44.4% by weight), polypropylene (33.3% by weight) and modified polypropylene (22.3% by weight) were melted and kneaded in the similar manner to that of example 1 to prepare test pieces.

Table 1 shows that test pieces obtained in example 1 have better impact strength than those of comparison examples 1 and 2. No lowering is seen in modulus of flexural elasticity and heat distortion temperature. This is beyond expectation, in view of the fact that a rubbery material usually added in order to improve impact strength greatly degrades those properties. Furthermore, appearance of products obtained by comparison examples 1 and 2 is not good and has phase-separation, but that of example 1 is uniform and excellent.

Strand-cutting test in which the samples were melted and kneaded in a twin-screw continuous kneader ("TEX" ® 44, manufactured by Nippon Steel manufacturing Co. Ltd.) before cutting showed that a sample obtained in example 1 could be taken-up but those obtained in comparison examples 1 and 2 were in vain, since melt viscosity of the latter at a die was so small that no strand long enough was obtained.

EXAMPLE 2

Example 1 was repeated except that a resin composition (100 parts by weight) made from polyphenylene ether (50% by we , polypropylene (25% by weight) and modified-polypropylene (25% by weight) and glycidyl methacrylate/ethylene/vinyl acetate copolymer (25 parts by weight) were used in place of the resin composition and 11.1 parts by weight of the glycidyl methacrylate/ethylene/vinyl acetate copolymer employed in example 1, respectively.

Results are given in Table 2.

COMPARISON EXAMPLE 3

Example 1 was repeated except that a resin composition (100 parts by weight) made from polyphenylene ether (44.4% by weight), polypropylene (33.3% by weight) and modified polypropylene (22.3% by weight) and ethylene/vinyl acetate copolymer (11.1 parts by weight) were used in place of the resin composition and the glycidyl methacrylate/ethylene/vinyl acetate copolymer employed in example 1, respectively.

Results are given in Table 2.

COMPARISON EXAMPLE 4

Example 1 was repeated except that a resin composition (100 parts by weight ) made from polyphenylene ether (50% by weight), polypropylene (25% by weight) and modified polypropylene (25% by weight) and ethylene/vinyl acetate copolymer (25 parts by weight) were used in place of the resin composition and the glycidyl methacrylate/ethylene/vinyl acetate copolymer employed in example 1, respectively.

Results are given in Table 2.

Products of example 2 is superior to those of comparison examples 1 and 2, in respect of impact strength and balance in properties, too. In particular, a product of example 2 is much higher than that of example 1 in respect of impact strength, without so large reduction in modulus of flexural elasticity and heat distortion temperature. This improvement owes to the fact that an amount of epoxy compound employed in example 2 is more than that in example 1. So is comparison of the product of example 2 with the products prepared by comparison examples 3 and 4 wherein ethylene/vinyl acetate copolymer is used.

Compatibility in comparison examples 3 and 4 is not good and the products obtained therein are not good in appearance.

EXAMPLE 3

Example 1 was repeated except that epoxy resin ("Sumiepoxy" ® ELM-434, 1 part by weight) was used in place of the glycidyl methacrylate/ethylene/vinyl acetate copolymer (11.1 parts by weight) in example 1.

Results are given in Table 3.

Appearance of the product is good and compatibility is satisfactory.

EXAMPLE 4

Example 1 was repeated except that a resin composition where amounts of polyphenylene ether and of polypropylene were changed to 10% by weight and 67.7% by weight in place of 44.4 and 33.3%, respectively, was used in place of the resin composition employed in example 1.

Results are given in Table 3.

EXAMPLE 5

Example 1 was repeated except that a resin composition where amounts of polyphenylene ether and of polypropylene were changed to 77.7% by weight and 0% by weight in place of 44.4 and 33.3%, respectively, was used in place of the resin compositon employed in example 1.

Results are given in Table 3.

COMPARISON EXAMPLE 5

Example 1 was repeated except that a resin composition wherein amounts of polyphenylene ether and of polypropylene were changed to 4% by weight and 73.7 by weight in place of 44.4 and 33.3%, respectively, was used in place of the resin composition employed in example 1.

Results are given in Table 3.

COMPARISON EXAMPLE 6

Example 1 was repeated except that a resin composition (100 parts by weight) where amounts of polyphenylene ether, polypropylene and modified polypropylene were changed to 98% by weight, 0% by weight and 2% by weight, in place of 44.4, 33.3 and 23.3%, respectively, was used in place of the resin composition employed in example 1.

Results are given in Table 3.

COMPARISON EXAMPLE 7

Example 1 was repeated except that glycidyl methacrylate/ethylene/vinyl acetate copolymer (60 parts by weight) was used in place of 11.1 parts by weight.

Results are given in Table 3.

Comparison example 5 shows that a too small amount of polyphenylene ether does not contribute to improve heat resistance of a composition which is at a level as low as that of polypropylene alone (Reference example).

Comparison example 6 shows that an improvement in impact strength is small. Furthermore, processability of the product of comparison example 6 is poor, because melt index is as low as less than 0.1 g/10 min. (280° C., 2.16 Kg/cm² load). In comparison example 7, no molten state is obtained because of too much gellation, and properties of the product are not good.

As explained above, the present resin composition has higher impact strength than polyphenylene ether without substantial degradation in heat resistance, since compatibility between polyphenylene ether and polyolefin is greatly improved. New development in use is expected, since the present resin composition is superior in balance among properties, appearance and processability. The present resin composition is easily able to work by shaping procedures which are familiar to the skilled, for example, injection molding, extrusion molding, etc., to produce various shaped articles, film, sheet which are superior in balance among heat resistance, impact resistance and modulus of flexural elasticity. No commercial product has been obtained which is made of the similar resin composition to the present one, because melt viscosity of polyphenylene ether is too far from that of polyolefin and molecular structure of polyphenylene ether does not allow compatibility with polyolefin.

TABLE 1

| | ① | | | ② Glycidyl methacrylate/ethylene/vinyl acetate copolymer (parts by weight every 100 parts by weight of ①) | Izod impact notched (Kg·cm/cm²) | Modulus of flexural elasticity (Kg/cm²) | H.D.T. (°C.) (18.6 Kg/cm²) |
|---|---|---|---|---|---|---|---|
| | Polyphenylene ether (wt %) | Polypropylene (wt %) | Modified polypropylene (wt %) | | | | |
| Example 1 | 44.4 | 33.3 | 22.3 | 11.1 | 4.8 | 15,200 | 115 |
| Comparison example 1 | 40 | 60 | — | — | 3.0 | 14,700 | 120 |
| Comparison example 2 | 44.4 | 33.3 | 22.3 | — | 3.1 | 14,500 | 119 |

TABLE 2

| | ① | | | ② * | | Izod impact notched (Kg·cm/cm²) | Modulus of flexural elasticity (Kg/cm²) | H.D.T. (°C.) (18.6 Kg/cm²) |
|---|---|---|---|---|---|---|---|---|
| | Polyphenylene ether (wt %) | Polypropylene (wt %) | Modified polypropylene (wt %) | Glycidyl methacrylate/ethylene/vinyl acetate copolymer | Ethylene/vinyl acetate copolymer | | | |
| Example 2 | 50 | 25 | 25 | 25 | — | 6.1 | 12,200 | 105 |
| Comparison example 3 | 44.4 | 33.3 | 22.3 | — | 11.1 | 3.4 | 13,600 | 100 |
| Comparison example 4 | 50 | 25 | 25 | — | 25 | 4.0 | 8,200 | 85 |

*parts by weight every 100 parts by weight ①

TABLE 3

| | ① | | | ② * Epoxy compound (parts by weight) | Izod impact notched (Kg·cm/cm²) | Modulus of flexural elasticity (Kg/cm²) | H.D.T. (°C.) (18.6 Kg/cm²) |
|---|---|---|---|---|---|---|---|
| | Polyphenylene ether (wt %) | Polypropylene (wt %) | Modified polypropylene (wt %) | | | | |
| Example 3 | 44.4 | 33.3 | 22.3 | "Sumiepoxy" ® ELM-434 | 3.7 | 15,000 | 120 |

TABLE 3-continued

| | ① | | | ② * | | Modulus of | |
|---|---|---|---|---|---|---|---|
| | Polyphenylene ether (wt %) | Polypropylene (wt %) | Modified polypropylene (wt %) | Epoxy compound (parts by weight) | Izod impact notched (Kg·cm/cm$^2$) | flexural elasticity (Kg/cm$^2$) | H.D.T. (°C.) (18.6 Kg/cm$^2$) |
| Example 4 | 10 | 67.7 | 22.3 | **11.1 1.0 | 5.0 | 13,500 | 80 |
| Example 5 | 77.7 | — | 22.3 | **11.1 | 4.0 | 18,700 | 155 |
| Comparison example 5 | 4.0 | 73.7 | 22.3 | **11.1 | 5.2 | 13,000 | 65 |
| Comparison example 6 | 98 | — | 2.0 | **11.1 | 3.5 | 19,500 | 160 |
| Reference example | — | 100 | — | — | 2.7 | 15,000 | 70 |
| Comparison example 7 | 44.4 | 33.3 | 22.3 | **60 | 4.0 | 8,000 | 70 |

*every 100 parts by weight of ①
**Glycidyl methacrylate/ethylene/vinyl acetate copolymer

We claim:
1. A thermoplastic resin composition comprising:
A. 100 parts by weight of a composition including
1. 5–95% by weight of a polyphenylene ether being an oxidation polymerization product of at least one phenol compound of formula

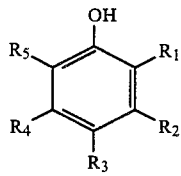

wherein $R_1$, $R_2$, $R_3$, r4, and $R_5$ each represents a hydrogen atom, a halogen atom, or a substituted or unsubstituted hydrocarbon residue, wherein at least one of $R_1$-$R_5$ is hydrogen; and
2. 95–5% by weight of a mixture of 1–99% by weight polypropylene and 99–1% by weight modified polypropylene, said modified polypropylene having been obtained by grafting at least onecomonomer selected from the group consisting of an oxazoline and a compound having a group selected from a carboxyl, an acid anhydride, an acid amide, an amino and a hydroxyl; and
B. 0.01–50 parts by weight of an epoxy compound selected form unsaturated epoxy compound/ethylene copolymer, and unsaturated epoxy compound/ethylene/ethylenically unsaturated compound copolymer, wherein the ethylenically unsaturated compound excludes ethylene.

2. A thermoplastic resin composition according to claim 1 wherein the polyphenylene ether (a) is homopolymer of 2,6-dimethylphenol or 2,6-diphenylphenol, or copolymer of a large amount of 2,6-dimethylphenol and a small amount of 3-methyl-6-t-butylphenol or 2,3,6-trimethylphenol.

3. A thermoplastic resin composition according to claim 1 wherein the modified-polyolefin (b) is polyolefin modified with acrylic acid or maleic anhydride.

4. A thermoplastic resin composition according to claim 1 wherein the composition (A) contains 10–80% by weight of polyphenylene ether (a).

5. A thermoplastic resin composition according to claim 1 wherein the composition (A) contains 20–70% by weight of polyphenylene ether (a).

6. A thermoplastic resin composition according to claim 1 wherein an amount of the epoxy compound (B) is 0.01–30 parts by weight.

* * * * *